United States Patent

Seng et al.

[11] Patent Number: 5,839,542
[45] Date of Patent: Nov. 24, 1998

[54] INDUSTRIAL TRUCK WITH AN OPERATING CONSOLE

[75] Inventors: Gert Seng, Reutligen; Burkhard Fritz, Metzingen, both of Germany

[73] Assignee: Wagner Fordertechnik, Germany

[21] Appl. No.: 534,930

[22] Filed: Sep. 28, 1995

[30] Foreign Application Priority Data

Sep. 29, 1994 [DE] Germany .......................... 44 34 909.2
Oct. 20, 1994 [DE] Germany .......................... 44 37 568.9

[51] Int. Cl.$^6$ ....................................... B66F 9/06
[52] U.S. Cl. ........................ 187/222; 180/326; 296/65.1
[58] Field of Search .......................... 187/222; 296/65.1; 180/326, 329, 330

[56] References Cited

U.S. PATENT DOCUMENTS

| | | | |
|---|---|---|---|
| 1,497,489 | 6/1924 | Cochran . | |
| 3,394,770 | 7/1968 | Goodacre | 180/54 |
| 4,920,820 | 5/1990 | Ingham et al. | 74/491 |
| 5,044,472 | 9/1991 | Dammeyer et al. | 187/9 R |
| 5,275,255 | 1/1994 | Huntley et al. | 180/326 |
| 5,364,151 | 11/1994 | Yurasits | 296/65.1 |

FOREIGN PATENT DOCUMENTS 0555025  8/1993  European Pat. Off. ........ B66F 9/075

OTHER PUBLICATIONS

Notice of Opposition, dated Mar. 29, 1996. 8 pages.
English–language translation of Notice of Opposition, 7 pages.
Exhibits attached to Notice of Opposition. See Exhibit list in the English language attached hereto.

Primary Examiner—William E. Terrell
Assistant Examiner—Khoi H. Tran
Attorney, Agent, or Firm—Webb Ziesenheim Bruening Logsdon Orkin & Hanson, P.C.

[57] ABSTRACT

A high-lift order picking industrial truck is equipped with a driver's stand which can be moved up and down together with a load picking device on a lifting framework. At least one operating console is disposed in the area of the driver's stand and is designed as a "standing seat" which allows the operator to face towards the load side. The controls of the operating console are disposed at the sides of the seat of the operating console. A folding seat is disposed under the operating console and the operating console forms the backrest for the folding seat.

4 Claims, 3 Drawing Sheets

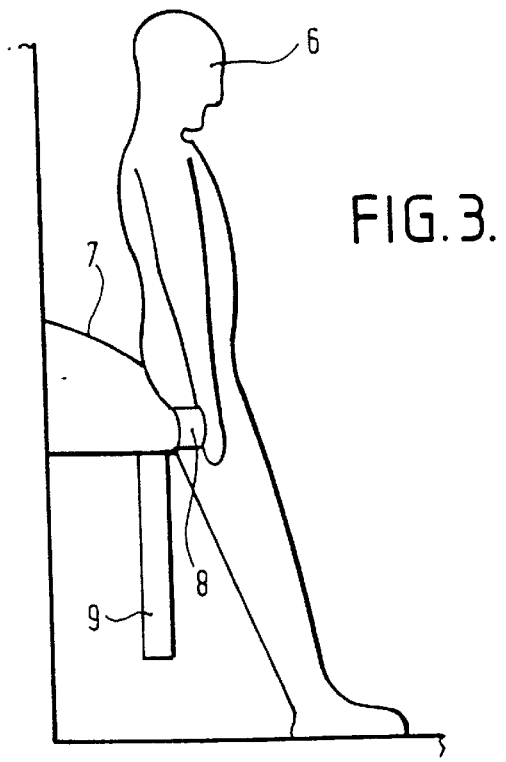
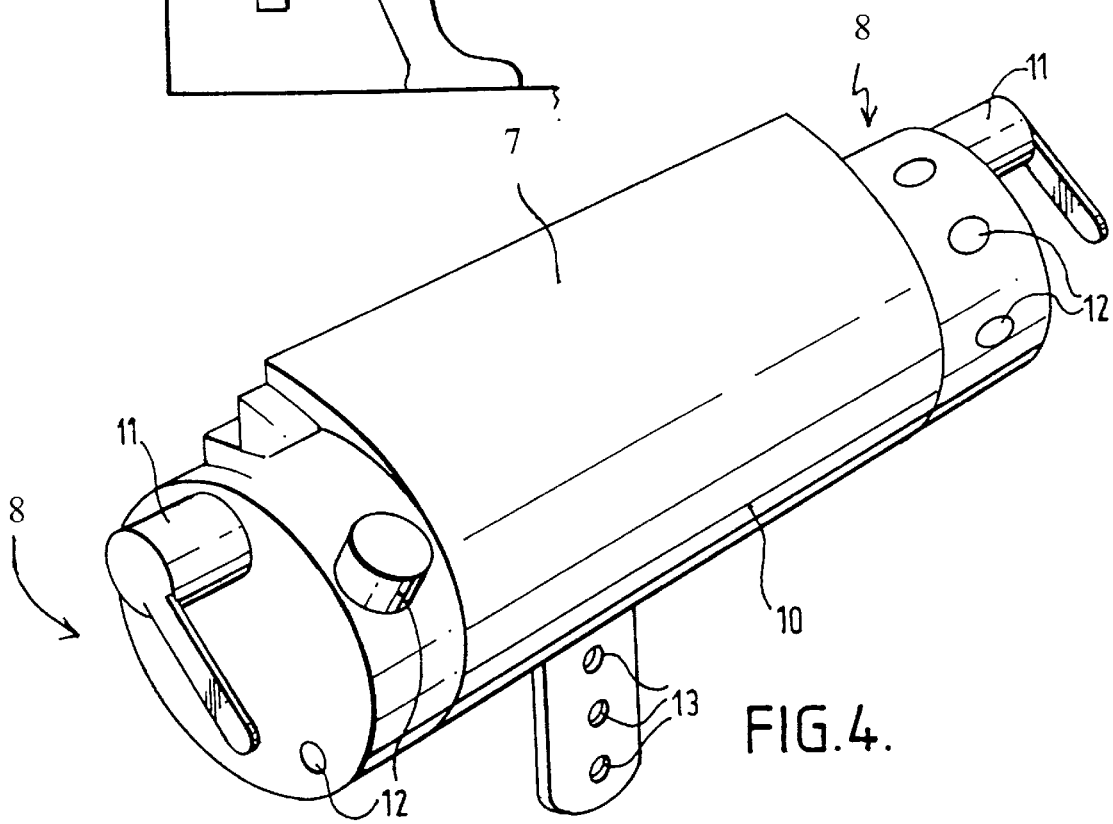

INDUSTRIAL TRUCK WITH AN OPERATING CONSOLE

BACKGROUND OF THE INVENTION

1. Field of the Invention

This invention concerns an industrial truck, in particular a high-lift picking truck, with a driver's stand which is secured to a lifting mast so that it can be moved up and down together with a load picking device on a lifting framework, and at least one operating console disposed in the area of the driver's stand.

2. Description of the Prior Art

High-lift order picking trucks are used for picking objects in high shelves and are usually equipped with an operating console in the driver's stand. The operating console contains all the indicators and controls, e.g. steering wheel, lifting/lowering control, driving control, which the driver requires to operate the high-lift order picking truck. It is conventional to provide one of two different operating console arrangements, either with the operating console on the load side of the operator or on the lifting mast side.

With the console placed on the load side, the operating console is located between the driver and the load picking device. In this arrangement, the operating console is disposed in the order picking space, and thus it obstructs the driver when picking loads.

With the console on the lifting mast side, the operating console is located between the driver and the lifting mast. A disadvantage of this arrangement is that the operating console is not within the driver's reach during picking up or setting down a load. To operate a control, the driver must turn around completely to face away from the load.

A common drawback of both the conventional arrangements is that when travelling in one direction the driver has to turn his head towards the rear while driving in order to be able to look in the direction of travel.

The underlying object of the present invention is to provide an industrial truck of the kind described above whose controls are arranged in an ergonomically advantageous manner.

SUMMARY OF THE INVENTION

According to the present invention, there is provided an industrial truck having a lifting mast and a driver's stand which is secured to the lifting mast so that it can be moved up and down, and a load picking device mounted on a lifting framework on a load side of the driver's stand, and with at least one operating console disposed in the area of the driver's stand, wherein the operating console is embodied as a standing seat oriented so that the operator faces towards the load side when leaning back on the console.

When the operator is leaning back on the operating console (facing away from the console), the controls are within reach of the driver without any change in body attitude and the driver keeps his entire body oriented towards the load. The order picking space is free of controls. When driving the truck in a direction such that the lifting mast precedes the operator, the driver turns around to stand in front of the operating console, looking towards it and the mast. The controls are then within easy reach in front of the driver.

An embodiment in which the controls of the operating console are disposed at the sides next to the seat of the operating console is particularly advantageous. With this arrangement, the controls are guaranteed to be within easy reach. In addition, the controls only project a small distance above the seat, so that the entire operating console only takes up little room.

The controls are advantageously embodied as turning levers or as buttons.

In a further embodiment, the operating console is adjustable in height.

One variation of the invention provides a folding seat disposed under the operating console. The folding seat provides a chance for the driver to sit during breaks in the work.

It is particularly advantageous if, when the folding seat is disposed in a horizontal position, the operating console is disposed so that the operating console forms a backrest for the folding seat. This produces a genuine resting seat with a backrest which is conveniently stowed in a space-saving manner under the operating console during order picking.

In a variation, at least one further operating console is disposed in the area of the driver's stand. This further operating console can be embodied as a conventional operating console. However, it is also possible for the additional operating console to be incorporated for example in the handrail in front of the load picking means and hence to be within easy reach during order picking. With a reduced range of functions, the additional operating console can be made relatively small.

Further advantages and specific features of the invention are explained in greater detail with reference to the exemplary embodiment illustrated in the accompanying diagrammatic figures, in which:

BRIEF DESCRIPTION OF THE DRAWINGS

FIG. 3 is a side elevation view of an operator using the operating console according to the invention;

FIG. 4 is a perspective view of an operating console according to the invention.

DETAILED DESCRIPTION OF PREFERRED EMBODIMENTS OF THE INVENTION

Figure 1:
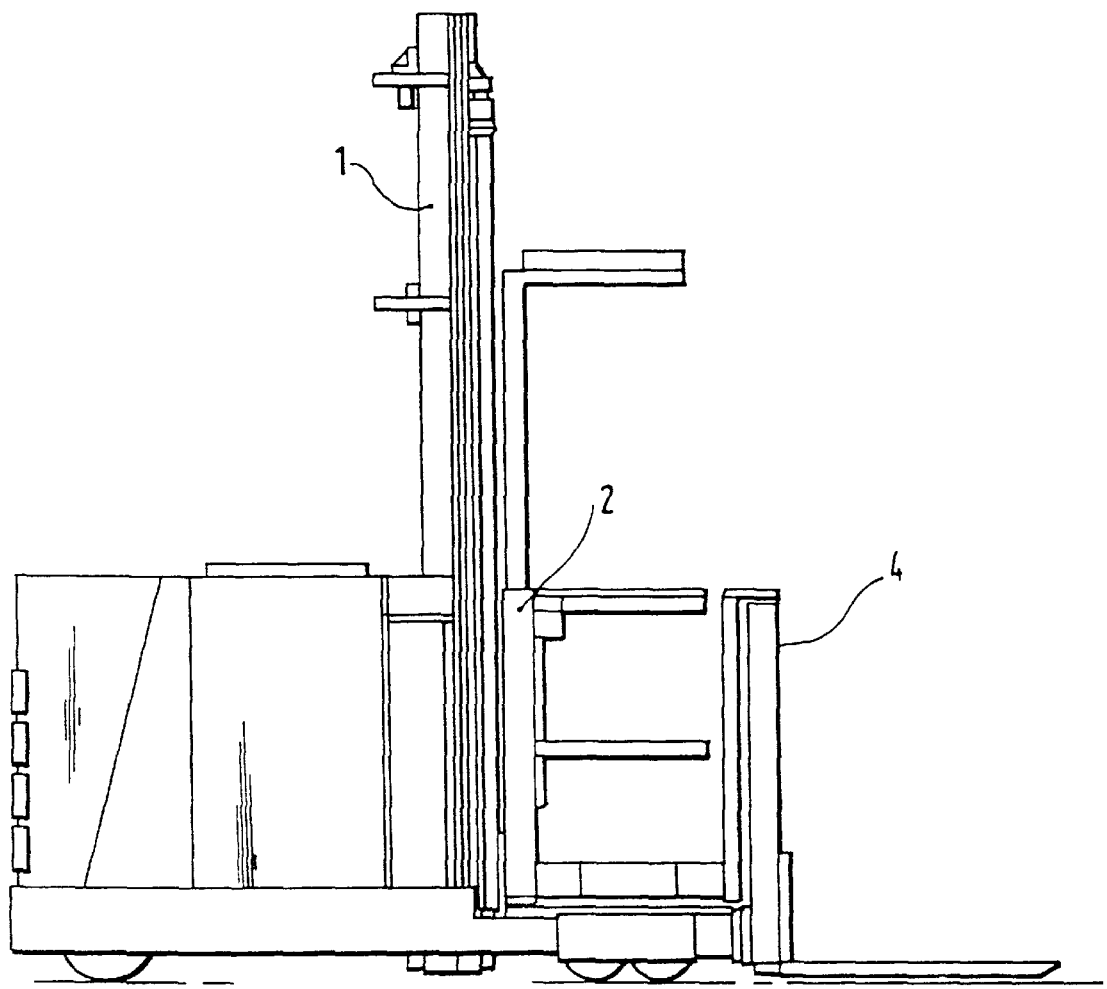
FIG. 1 is a side elevation view showing a prior art high-lift order picking truck.

Referring now to the drawings, FIG. 1 shows a high-lift truck having a lifting mast 1 extending upwardly from the truck body, and a driver's stand 2 which can be moved upwardly on the lifting mast 1. A load-picking means, in this case a fork 3, is mounted to the driver's stand 2, and can be raised and lowered relative thereto on guide rails 4. The fork 3 is also termed the "initial lift."

Figure 2:
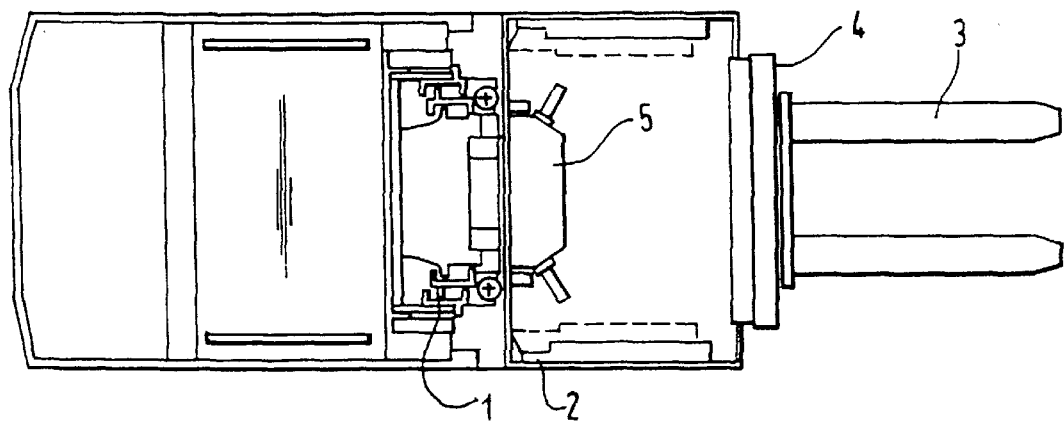
FIG. 2 is a plan view of the prior art high-lift picking truck shown in FIG. 1.

FIG. 2 shows the high-lift order picking truck of the kind described, in a plan view. Here, a conventional operating console 5 is disposed on the mast side of the operator's position, and the operator faces toward the mast when operating the driving and lifting controls.

FIG. 3 shows an arrangement of the operating console according to the invention. The driver 6 leans on the operating console 7, which is designed as a "standing seat," with the appropriate body attitude. The driver's hands are placed on the controls 8. A folding seat 9 can be seen in the folded position under the operating console 7.

FIG. 4 shows an operating console 7 according to the invention in greater detail. The console 7 extends horizontally, and is generally cylindrical in form. The controls for the truck motors, lifting gear, etc. are disposed at the left and right of a padded central part 10 of the console 7. The controls are preferably in the form of turning levers 11 and buttons 12. The operating console is secured to the driver's stand 2 and is adjustable in height by means of the row of holes 13 disposed at different heights in a support strut 14. In use, the operator or driver 6 sets the height of the console 7 to suit his or her stature, and leans back on it with the padded part 10 of the console supporting the lower spine. The operator thus faces towards the load, but with his or her view unimpaired by the operating console.

Figure 5:
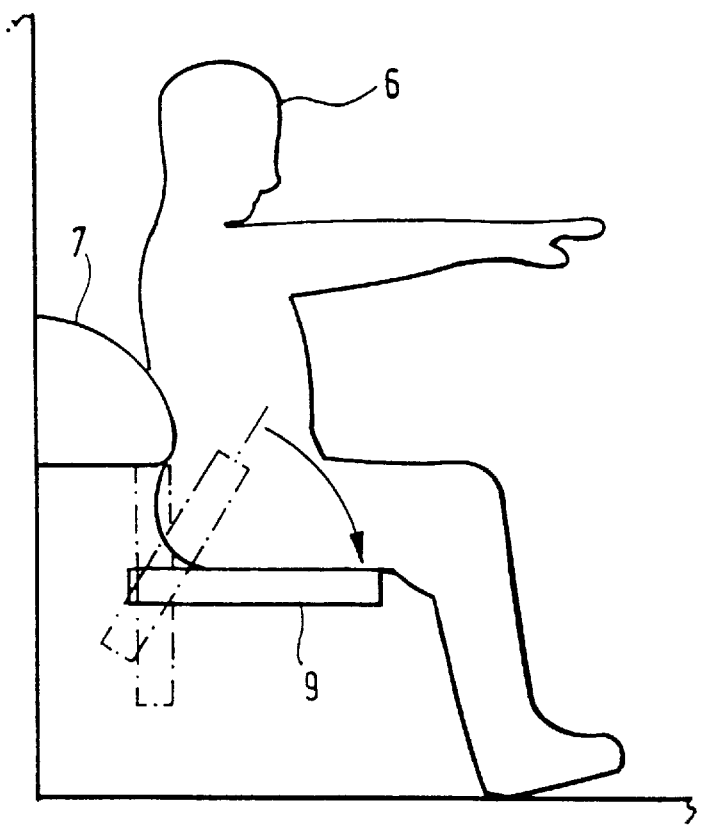
FIG. 5 shows an arrangement of the folding seat according to the invention.

FIG. 5 shows the arrangement of an additional folding seat 9, pivotally mounted under the operating console 7. When the truck is in use, the folding seat 9 is placed in a folded position, in a generally vertical plane beneath the console 7. The folding seat is pivotable about a horizontal axis to a position for use, in a generally horizontal plane spaced below the height of the console 7. During breaks in the work, the driver 6 can pivot the folding seat to the use position and sit on the folding seat 9, using the operating console 7 as a backrest. The folded position and an intermediate position of the folding seat 9 are shown in dashed lines.

Having described presently preferred embodiments of the invention, it is to be understood that it will be otherwise embodied within the scope of the appended claims.

We claim:

1. An industrial truck comprising a lifting framework, a driver's stand secured to the lifting framework, a load picking device mounted on a load side of the driver's stand, and at least one operating console disposed in the area of the driver's stand, the operating console embodied as an elongated standing seat having opposed ends and oriented so that an operator faces towards the load side when leaning back on the console, wherein the operating console has truck controls and wherein the elongated standing seat has a central horizontally elongated padded part which is arcuate about an axis of elongation and the truck controls of the operating console are disposed on the ends of the operating console.

2. An industrial truck according to claim 1, wherein the controls are one of pivoting levers and buttons.

3. An industrial truck according to claim 1, including means for adjusting the height of the operating console.

4. An industrial truck according to claim 1, wherein at least one further operating console is disposed in the area of the driver's stand.

* * * * *